(12) United States Patent
Aharon et al.

(10) Patent No.: US 9,036,206 B2
(45) Date of Patent: May 19, 2015

(54) COLOR UNIFORMITY CORRECTION USING A SCANNER

(75) Inventors: Michal Aharon, Haifa (IL); Hadas Kogan, Zichron Yaacov (IL); Meirav Naaman, Ness Ziona (IL); Lior Katz, Ness Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/126,103

(22) PCT Filed: Jun. 22, 2011

(86) PCT No.: PCT/US2011/041347
§ 371 (c)(1),
(2), (4) Date: Dec. 13, 2013

(87) PCT Pub. No.: WO2012/177244
PCT Pub. Date: Dec. 27, 2012

(65) Prior Publication Data
US 2014/0111836 A1 Apr. 24, 2014

(51) Int. Cl.
*H04N 1/48* (2006.01)
*H04N 1/60* (2006.01)
*H04N 1/028* (2006.01)
*H04N 1/04* (2006.01)
*H04N 1/387* (2006.01)
*H04N 1/40* (2006.01)
*H04N 1/46* (2006.01)
*H04N 1/00* (2006.01)
*H04N 1/50* (2006.01)
(Continued)

(52) U.S. Cl.
CPC ............... *H04N 1/60* (2013.01); *H04N 1/028* (2013.01); *H04N 1/04* (2013.01); *H04N 1/387* (2013.01); *H04N 1/40* (2013.01); *H04N 1/46* (2013.01); *H04N 1/00015* (2013.01); *H04N 1/00023* (2013.01); *H04N 1/00058* (2013.01); *H04N 1/00068* (2013.01); *H04N 1/00082* (2013.01); *H04N 1/00278* (2013.01); *H04N 1/48* (2013.01); *H04N 1/50* (2013.01); *B41F 33/0036* (2013.01); *H04N 1/401* (2013.01)

(58) Field of Classification Search
None
See application file for complete search history.

(56) References Cited

U.S. PATENT DOCUMENTS 4,649,502 A * 3/1987 Keller et al. .................. 358/1.9
6,554,388 B1 4/2003 Wong et al.
7,729,015 B2 6/2010 Mizes et al.
(Continued)

OTHER PUBLICATIONS

Patent Cooperation Treaty, "International Search Report," issued by the International Searching Authority in connection with PCT application No. PCT/US2011/041347, mailed Feb. 17, 2012 (3 pages).
(Continued)

*Primary Examiner* — Kimberly A Williams
(74) *Attorney, Agent, or Firm* — Fletcher Yoder; Michael G Fletcher

(57) ABSTRACT

Techniques for correcting the color uniformity of a laser printer of a digital press or other device are provided. A process for correcting the color uniformity of a laser printer may include scanning a test page by an inline scanner of a digital press, determining scanner signal data from the test page, determining a scanner polynomial fitted to the scanner signal data, and determining a non-uniform coverage polynomial from the scanner polynomial. Additionally, techniques for verifying the linearity of a scanner are also provided.

20 Claims, 8 Drawing Sheets

(51) Int. Cl.
*B41F 33/00* (2006.01)
*H04N 1/401* (2006.01)

(56) References Cited

U.S. PATENT DOCUMENTS

| | | | |
|---|---|---|---|
| 2001/0033395 A1 | 10/2001 | Chizawa | |
| 2002/0159107 A1 | 10/2002 | Maruta et al. | |
| 2003/0090727 A1* | 5/2003 | Piatt et al. | 358/3.01 |
| 2003/0142985 A1* | 7/2003 | Sampath et al. | 399/9 |
| 2003/0179924 A1* | 9/2003 | Holm | 382/162 |
| 2004/0021886 A1* | 2/2004 | Boesten | 358/1.9 |
| 2004/0090522 A1* | 5/2004 | Rauch et al. | 347/234 |
| 2005/0046655 A1* | 3/2005 | Iannazzi | 347/19 |
| 2006/0176526 A1* | 8/2006 | Iannazzi | 358/504 |
| 2006/0227391 A1 | 10/2006 | Updegraff | |
| 2007/0052991 A1* | 3/2007 | Goodman et al. | 358/1.12 |
| 2007/0177231 A1* | 8/2007 | Wang et al. | 358/504 |
| 2007/0201066 A1 | 8/2007 | Ziv | |
| 2008/0024586 A1 | 1/2008 | Barron | |
| 2009/0086292 A1* | 4/2009 | Klassen | 358/504 |
| 2009/0091805 A1 | 4/2009 | Tanabe et al. | |
| 2009/0213414 A1 | 8/2009 | Braverman et al. | |
| 2010/0003045 A1 | 1/2010 | Kella et al. | |
| 2010/0074639 A1 | 3/2010 | Waidman et al. | |
| 2010/0097657 A1 | 4/2010 | Kuo et al. | |
| 2011/0058186 A1* | 3/2011 | Ramesh et al. | 358/1.9 |
| 2011/0058226 A1* | 3/2011 | Ramesh et al. | 358/300 |
| 2011/0103813 A1 | 5/2011 | Shelef et al. | |
| 2012/0269527 A1* | 10/2012 | Kuo et al. | 399/49 |
| 2013/0010312 A1* | 1/2013 | Kuo et al. | 358/1.9 |
| 2013/0010313 A1* | 1/2013 | Munechika et al. | 358/1.9 |
| 2014/0132778 A1* | 5/2014 | Holub | 348/191 |

OTHER PUBLICATIONS

Patent Cooperation Treaty, "Written Opinion of the International Searching Authority," issued by the International Searching Authority in connection with PCT/US2011/041347, mailed Feb. 17, 2012 (4 pages).

* cited by examiner

COLOR UNIFORMITY CORRECTION USING A SCANNER

BACKGROUND

This section is intended to introduce the reader to various aspects of art, which may be related to various aspects of the present disclosure that are described or claimed below. This discussion is believed to be helpful in providing the reader with background information to facilitate a better understanding of the various aspects of the present disclosure. Accordingly, it should be understood that these statements are to be read in this light, and not as admissions of prior art.

The printing industry relies on delivering fast and accurate printed items, often in large quantities, for a variety of uses. In particular, the industrial printing industry faces various challenges in ensuring that printed items are identical and uniform. One particular challenge is ensuring the uniformity of color within a printed page of an item. Non-uniformity in such items may be measured in terms of the "dot area" (DA) that describes the area percentage that is covered by ink. The DA may be affected by various electrical, mechanical, and thermal factors. Typically, variations in the DA may be compensated for by changes to various parameters of the printing process. However, such changes are determined by offline techniques that do not compensate for constant changes in non-uniformity. Moreover, implementing such techniques in the field may add time and cost to the printing process.

DETAILED DESCRIPTION OF SPECIFIC EMBODIMENTS

Embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include techniques for correcting the laser power of a laser printer, such as used in a digital press, by using the scanner of the digital press. In some embodiments, a test page may be scanned by the scanner of the digital press and processed to reduce or eliminate the non-uniformity of the scanner. The scanned image may be processed to produce combined scanner signal data for the scanned image. A polynomial may be fitted to the scanner signal data and a non-uniform coverage polynomial may be estimated from the scanner polynomial. The estimated coverage polynomial may then be applied to correct the laser power parameter of the laser printer, thus enabling production documents, photographs, or other items having improved color uniformity.

Figure 1:
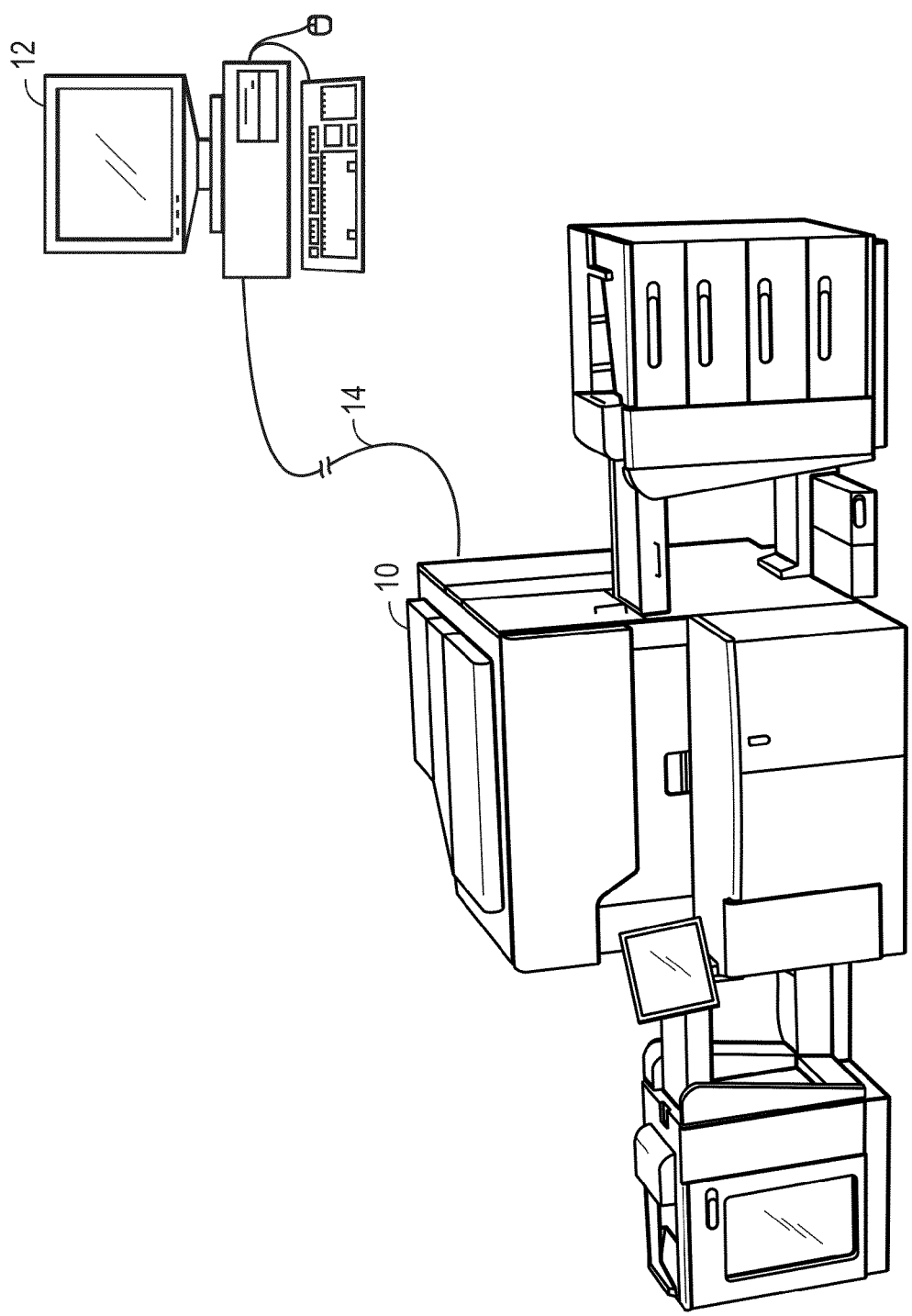
FIG. 1 depicts a digital press and a computer in accordance with an embodiment of the present invention.

FIG. 1 depicts a digital press 10 and a computer 12 in accordance with an embodiment of the present invention. The computer 12 may be coupled to the digital press 10 by a connection 14. The connection 14 may be a wired or wireless network, an interface such as USB, or any other suitable connection. In some embodiments, the computer 12 may include a print server, and may control the queuing and routing of jobs printed by the digital press 10. Specifically, the computer 12 and the press 10 are configured to cooperate to perform a process or act individually in accordance with the present embodiments. As described below, the digital press 10 may include various components and capabilities, such as printing documents, photographs, publications, labels, packaging, and the like.

Figure 2:
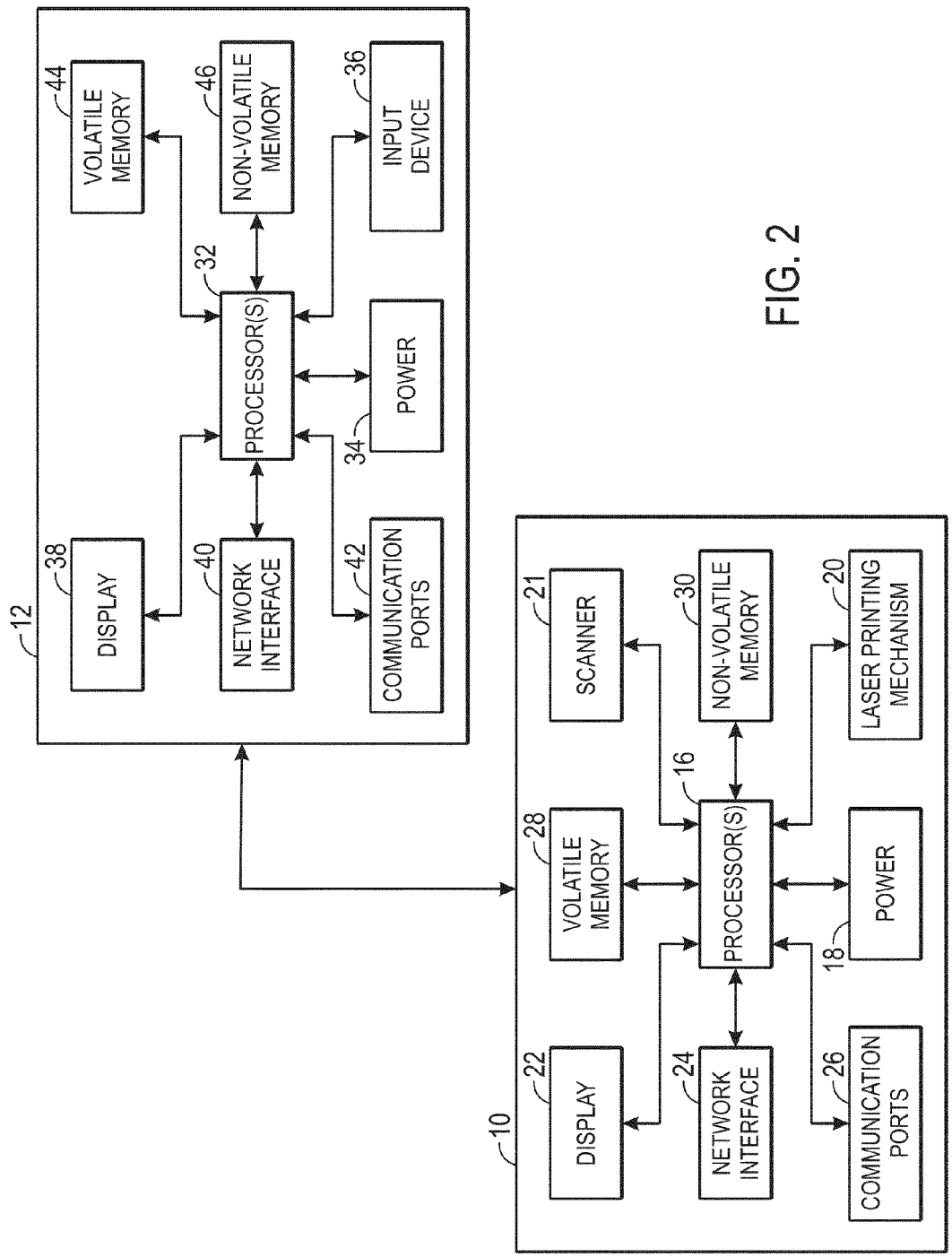
FIG. 2 is a block diagram of the digital press and the computer in accordance with an embodiment of the present invention.

FIG. 2 is a block diagram of the digital press 10 and the computer 12. The digital press 10 may include a processor 16 that controls the processing of system functions and requests. Additionally, the press 10 may include a power supply 18, a laser printer 20, a scanner 21, a display 22, a network interface 24, communication ports 26, a volatile memory 28, and a non-volatile memory 30.

The power supply 18 of the digital press 10 may include an AC adapter, which facilitates connection to the press 10 to an AC power system as a power source, such as through a wall outlet. The power supply 18 may also include a DC adapter, permanent batteries, replaceable batteries, and/or rechargeable batteries. The display 22 of the press 10 may include an LCD display, LEDs, or any other suitable display. In some embodiments, the display 22 may include a touch screen and may display a user interface for the press 10. Furthermore, the press 10 may include the network interface 24 for communicating over a network, such as a wired or wireless Ethernet network. The press 10 may also include one or more communication ports 26 for coupling to another device, such as the computer 12, and to a network, such as a local area network, remote area network, intranet, or the Internet, for example.

The processor 16 generally controls the press 10 by accessing data, such as instructions, stored in tangible, non-transitory, computer-readable media, such as the volatile memory 28 and non-volatile memory 30. The processor 16 may be an image processor, such as a raster image processor, for generating an image for printing. The memories 28 and 30 are operably coupled to the processor 16 to store data and facilitate execution of various programs. For example, the volatile memory 28 may include Dynamic Random Access Memory (DRAM) and/or Static Random Access Memory (SRAM). The non-volatile memory 30 may include a read-only memory (ROM), such as an EPROM, and/or flash memory to be used in conjunction with the volatile memory 28. The memories 28 and 30 may store code or instructions in accordance with present embodiments for implementation by the processor 16.

As mentioned above, the digital press 10 may also include a laser printer 20 that may include, for example, a laser, a drum, toner (such as from a cartridge), a fuser, etc., for fusing toner onto a printed page via the laser. The digital press 10 may also include a scanner 21 that may be, for example, an inline scanner capable of scanning printed documents and storing the scanned documents in the memories 28 and 30.

The computer 12 may include a processor 32 that controls the processing of system functions and requests. The computer 12 may include a number of components that include, for example, a power supply 34, an input device 36, a display 38, a network interface 40, communication ports 42, a volatile memory 44, and a non-volatile memory 46.

The power supply 34 of the computer 12 may include an AC adapter that facilitates connection of the computer 12 to an AC power system as a power source, such as through a wall outlet. The power supply 34 may also include a DC adapter, permanent batteries, replaceable batteries, and/or rechargeable batteries. The input device 36 may be coupled to the processor 32 and may include buttons, switches, a keyboard, a light pen, a mouse, and/or a voice recognition system, for instance. The display 38 may include an LCD display, a CRT, LEDs, and/or an audio display, for example. Furthermore, the computer 12 may include the network interface 40 for communicating over a network, such as a wired or wireless Ethernet network. One or more communication ports 42 may also be coupled to the processor 32. The communication ports 42 may be adapted to be coupled to one or more peripheral devices such as a modem, the printer 12, a computer, or to a network, such as a local area network, remote area network, intranet, or the Internet, for instance.

The processor 32 generally controls the computer 12 by accessing data, such as instructions, stored in tangible, non-transitory computer-readable media, such as the volatile memory 44 and non-volatile memory 46. These memories 44 and 46 are operably coupled to the processor 32 to store data and facilitate execution of various programs. For instance, the processor 32 may be coupled to the volatile memory 44 which may include Dynamic Random Access Memory (DRAM) and/or Static Random Access Memory (SRAM). As mentioned above, the processor 32 may also be coupled to the non-volatile memory 46. The non-volatile memory 46 may include a read-only memory (ROM), such as an EPROM, and/or flash memory to be used in conjunction with the volatile memory 44. Additionally, the non-volatile memory 46 may include magnetic storage such as tape drives, hard disk drives, and the like. The memories 44 and 46 may store code or instructions in accordance with present embodiments for implementation by the processor 32.

Figure 3:
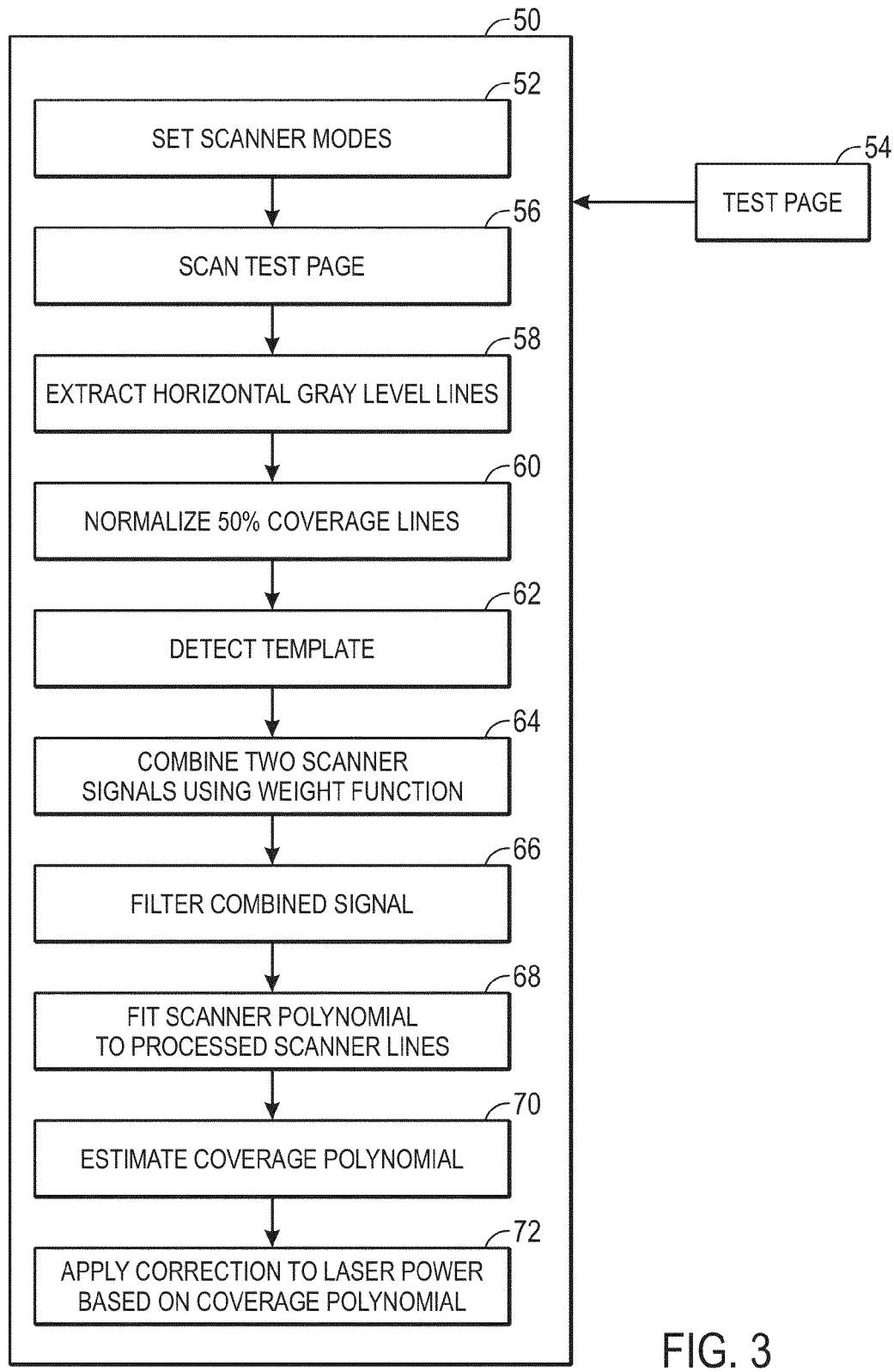
FIG. 3 is a block diagram of a process for correcting color uniformity by using a scanner of a printing device in accordance with an embodiment of the present invention.

As mentioned above, embodiments of the present invention include a technique for correcting the color uniformity of the printer 20 of the digital press 10 by using the scanner 21. FIG. 3 depicts an embodiment of a process 50 for correcting color uniformity of a printing device by using a scanner of the device, such as the scanner 21 of the press 10. It should be appreciated that the process 50 may be applied to any printing device having a scanner and a laser printer integrated in the device, such as all-in-one printers, copiers, or any other suitable printing device.

Some or all of the elements of the process 50 may be implemented as executable code instructions stored on a non-transitory tangible machine-readable media, such as the volatile memory 44 and non-volatile memory 46 of the computer 12 and executed by the processor 32, and such as the volatile memory 28 and non-volatile memory 30 of the press 10 and executed by the processor 16. The process 50 of FIG. 3 will be described with reference to FIGS. 4-7 that illustrate various aspects of the process 50. As discussed further below in FIG. 9, for optimal results the process 50 may be performed using a scanner having a linear or almost linear measurement response of the reflected spectrum.

Initially, the scanner modes of the scanner 21 may be set (block 52). Some of the scanner modes may be more suitable (e.g., more accurate) for the correction process 50. For example, as described below, in one embodiment the scanner 21 may be set to a "no color pipeline" mode (as opposed to a "default" mode). Regardless of the scanner mode, the scanner 21 may have a relative non-uniform response. Thus, as described further below, aspects of the process 50 may minimize or eliminate the scanner non-uniformity.

Next, a test page 54 may be provided, and the scanner 21 may scan the test page 54 (block 56) to produce a scanned image of the test page 54. An illustration of the test page is provided in FIG. 4 and described further below. As discussed below, the test page 54 may include a left scanner bar and a right scanner bar. In some embodiments, each scanner bar of the test page 54 may be scanned by a separate scanner. In such an embodiment, the scanner bars of the test page 54 may be combined in the manner described below. In other embodiments, the test page 54 may be scanned by a single scanner, three scanners, or more, depending on the width of the test page 54. The test page 54 is also relatively uniform and provides a basis for correcting the non-uniformity of the scanner 21 through normalization of the test page 54.

After scanning the test page 54, horizontal gray level lines in the scanned page may be extracted (block 58) by detecting small fiducials next to each line in the test page 54, such as by using a Kanade-Lucas-Tomasi feature tracking procedure. The same extraction may be applied to both the left and right scanner bars of the scanned image of the test page 54.

Next, each 50% coverage line of the scanned image may be normalized by the nearest white line to reduce or eliminate the scanner's non-uniformity across the scanned image (block 60). In some embodiments, the normalization may be based on an assumption that the non-uniformity of the scanner across the image is due to changes of the page height relative to the scanner and changes in illumination. The spatial non-uniformity of the scanner may be approximated by a bitwise multiplication of the "clean" scanner signal by a noise signal, as shown below in Equation 1:

$$\text{linescan}_{white} = 255 \cdot S_{noise} \quad (1)$$

Where:

$\text{Linescan}_{white}$ is the linescan signal for the white lines of the test page; and $S_{noise}$ is the scanner noise signal.

The scanner signal for the 50% coverage lines may be estimated as shown below in Equation 2:

$$\text{linescan}_{cov} = \text{linescan}_{normalized} \cdot S_{noise} \quad (2)$$

Where:

$\text{Linescan}_{cov}$ is the linescan signal for the 50% coverage lines; and $\text{Linescan}_{normalized}$ is the normalized linescan signal.

Finally, the normalized scanner signal may be determined from Equations 1 and 2 as shown below in Equation 3:

$$linescan_{normalized} = 255 \cdot \frac{linescan_{cov}}{linescan_{white}} \quad (3)$$

After normalization, symbols, e.g. cross templates, located in the lower part of the test page 54 may be detected (block 62) to provide alignment between left and right scanned images of the left and right scanner bars. Next, the two scanner signals from the left and right scanner bars may be combined (block 64) according to a weight function. An embodiment of the weight function is illustrated below in FIG. 5. In some embodiments, the weight function may be based on the assumption that a scanner bar produces more accurate results in the middle than the edges of the bar. The combined scanner signals may be calculated according to the weight function illustrated in FIG. 5 and shown below in Equation 4:

$$combined = w \cdot linescan_{normalized}^{left} + (1-w) \cdot linescan_{normalized}^{right} \quad (4)$$

Where:
combined is the combined scanner signal;
$linescan_{normalized}^{left}$ is the normalized scanner signal of the left scanner bar; and
$linescan_{normalized}^{right}$ is the normalized scanner signal of the left scanner bar.

Figure 6:
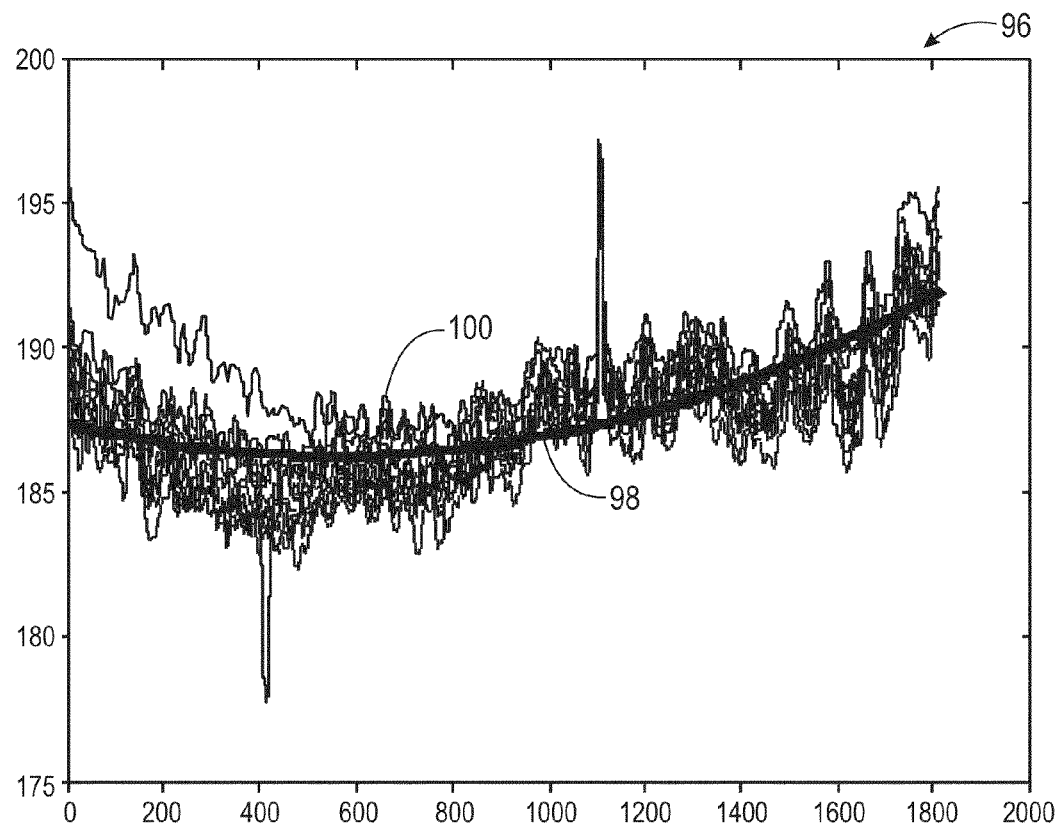
FIGS. 6 and 7 are graphs of a scanner polynomial of the process of FIG. 3 in accordance with an embodiment of the present invention.

Next, the combined signal (combined) may be filtered (block 66), such as by a median filter, to reduce outliers in the signal data. The filtering (block 66) may also include a mean filter to reduce Gaussian noise by subtracting the average of all rows of the scanner signal from each row to reduce all rows to the same level. Next, a scanner polynomial may be fit to the processed scanner signal data (block 68) for each of the four color separations, e.g., cyan, magenta, yellow and black, simultaneously (as depicted in FIG. 6). As discussed below, FIG. 6 depicts the combined scanner signal data and a second order polynomial fitted to the combined scanner signal data. The scanner polynomial shown in FIG. 6 may be represented by Equation 5 shown below:

$$P_s = A_s i^2 + B_s i + C_s \quad (5)$$

Where:
$P_s$ is the combined scanner signal;
i is the horizontal location on the scanned page; and
$A_s$, $B_s$, and $C_s$ are coefficients of the polynomial.

After estimation of the scanner polynomial, a polynomial describing the coverage non-uniformity across the page may be estimated from the scanner polynomial (block 70). Embodiments of a scanner polynomial and the corresponding non-uniform coverage polynomial are illustrated below in FIGS. 7 and 8 respectively. The non-uniform coverage polynomial shown in FIG. 8 may be represented by Equation 6 shown below:

$$P_c^{est} = A_c i^2 + B_c i + C_c \quad (6)$$

Where:
$P_c$ is the combined scanner signal;
i is the horizontal location on the scanned page; and
$A_c$, $B_c$, and $C_c$ are coefficients of the polynomial.

Figure 7:
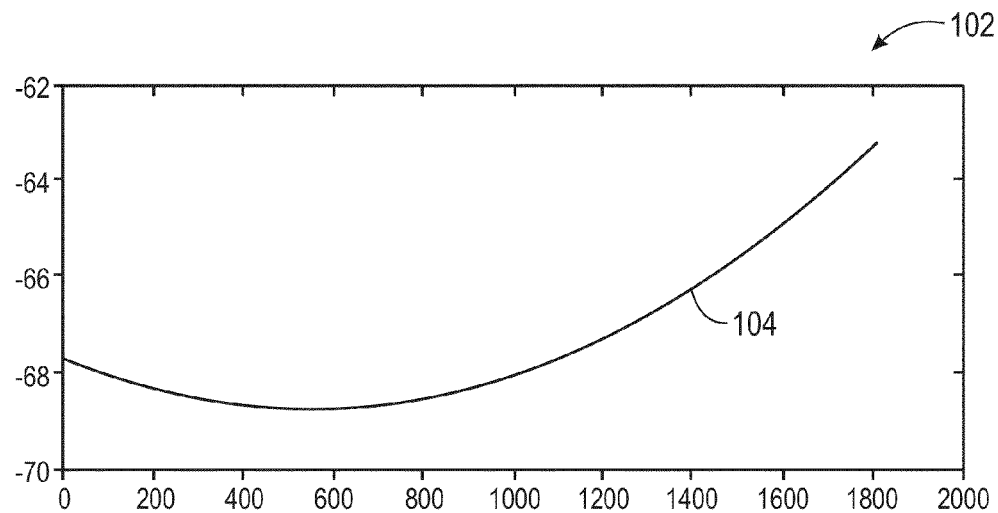
Figure 8:
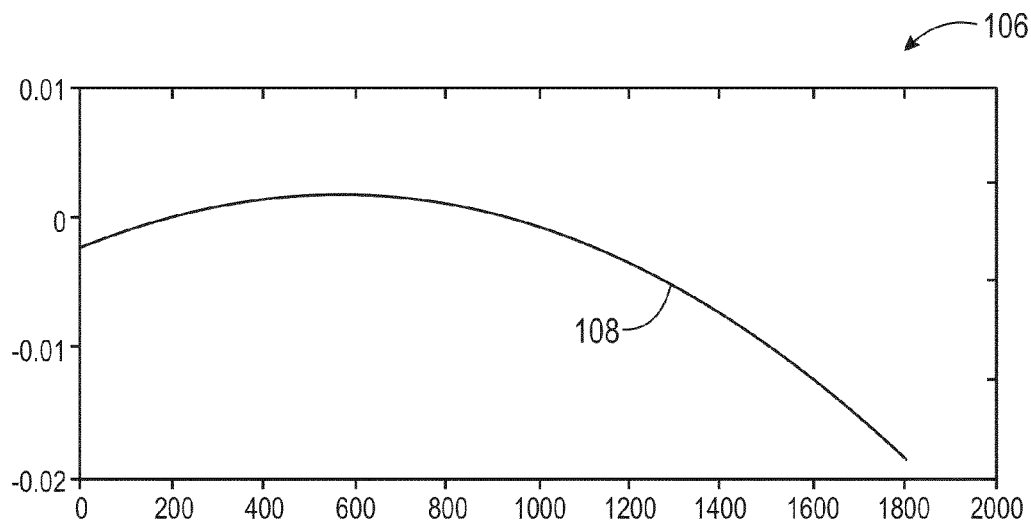
FIG. 8 is a graph of a coverage polynomial of the process of FIG. 3 in accordance with an embodiment of the present invention.

In some embodiments, the non-uniform coverage polynomial (e.g., Equation 6) may be determined using the following technique. First, as shown in FIGS. 7 and 8, the scanner polynomial and the non-uniform coverage polynomial are "flipped" such that $P_c$ is maximal where $P_s$ is minimal. This relationship occurs because where the coverage area is lower (e.g., a bright area) the gray level is higher. The location of the extremum of the parabola of the scanner polynomial may be determined by Equation 7:

$$x = \frac{-B_s}{2A_s} \quad (7)$$

Similarly, the location of the extremum of the parabola of the non-uniform coverage polynomial may be determined by Equation 8:

$$x = \frac{-B_c}{2A_c} \quad (8)$$

If, as discussed above, the extremum of the parabola of the scanner polynomial is equal to the extremum of the parabola of the non-uniform coverage polynomial, this relationship may be illustrated below in Equation 9:

$$\frac{-B_c}{2A_c} = \frac{-B_s}{2A_s} \quad (9)$$

Next, the gray level image output by the scanner may be derived from coverage information. For example, coverage may be estimated by Equation 10 shown below:

$$coverage = \frac{\sum S - \sum S_{white}}{\sum S_{solid} - \sum S_{white}} \quad (10)$$

Where:
S is the spectral reflectance;
$S_{white}$ is the white reflectance; and
$S_{solid}$ is the solid reflectance.

The sum of the spectral reflectance may be estimated from the scanner gray level measurements by assuming that the scanner is linear in this spectrum. Thus, the scanner gray level measurement may be determined from the sum of the relevant areas of the spectral reflectance. Based on this assumption, y may be determined by Equation 11 below:

$$\frac{cov(i_1)}{cov(i_2)} = \frac{scan_{i_1} - 255}{scan_{i_2} - 255} \quad (11)$$

Where:
cov is the coverage for a position i; and
$scan_i$ is the scanner measurement of for the position i.

By choosing the indices $i_1=0$ and $i_2=x$, and using the non-uniform coverage polynomial and scanner polynomial for the coverage and scanner determinations, the following equation (Equation 12) may be derived:

$$\frac{P_c^{est}(0)}{P_c^{est}\left(\frac{-B_c}{2A_c}\right)} = \frac{P_s(0) - 255}{P_s\left(\frac{-B_s}{2A_s}\right) - 255} \quad (12)$$

Finally, because a known reference location in the test page may be calibrated via an In Line Densitometer (ILD), the coverage at this known reference location in the page is unchanged. Thus, if $i_m$ is the index of the known reference location, then $P_c^{est}(i_m)=0$. From the assumptions described above and depicted in Equations 8-12, the following three equations (Equations 13, 14, and 15) may be determined:

$$x = \frac{-B_c}{2A_c} \quad (13)$$

$$y = \frac{P_c^{est}(o)}{P_c^{est}\left(\frac{-B_c}{2A_c}\right)} = \frac{C_c}{\frac{-B_c^2}{2A_c} + C_c} \quad (14)$$

$$0 = P_c^{est}(i_m) = A_c i_m^2 + B_c i_m + C_c \quad (15)$$

The coefficients, $A_c$, $B_c$, and $C_c$ of the coverage of the polynomial may then be solved for from the factors, x, y, and $i_m$ determined above. The determination of each of these coefficients is shown below in Equations 16, 17, and 18:

$$A_c = \frac{x}{i_m^2 - 2x \cdot i_m - 2\frac{x^2 y}{1-y}} \quad (16)$$

$$B_c = -2xA_c \quad (17)$$

$$C_c = \frac{-2x^2 y}{1-y} A_c \quad (18)$$

After determination of the non-uniform coverage polynomial (block 70), the laser power parameter of the laser printer 20 of the press 10 may be corrected based on the non-uniform coverage polynomial (block 72). For example, the correction may be applied in the manner described in U.S. patent application Ser. No. 12/440,698 entitled "Electrographic Dot Gain and Optical Density Decoupling Method, Xerographic Image Reproduction, and Systems, Methods, and Software Related Thereto," now published as U.S. Application Publication No. 2010/0003045, which is hereby incorporated by reference in its entirety. In some embodiments, the process 50 may be performed periodically to provide repeated corrections of the laser printer 20. For example, the process 50 may be performed every 30 minutes, every hour, every 2 hours, every 3 hours, every 4 hours, every 5 hours or greater, every day, every 2 days, every 3 days, every 4 days, every 5 days or greater, or every week or greater. In other embodiments, the process 50 may be performed on an "as-needed" basis to correct any measured or perceived non-uniformity of the printer 20.

Tables 1 and 2 below depict experimental results for an application of the scanner-based correction process described above. The experimental results were generated using an HP-7500 digital press available from Hewlett-Packard, Inc., of Palo Alto, Calif. The uniformity correction was estimated from test pages with 50% coverage and the same correction was applied to all coverages, e.g., the 75% coverage and 25% coverage shown below in Tables 1 and 2. The column of each of Tables 1 and 2 depicts the results for the 75% coverage, 50% coverage, and 25% coverage. Each row of each of Tables 1 and 2 depict the color separations cyan (C), magenta (M), yellow (Y), and black (K). Each record of Tables 1 and 2 depicts the dot area (DA) standard with the uniformity correction and the DA standard without the uniformity correction (depicted in each record as with/without):

TABLE 1

Experimental test results for inline-scanner based correction of HP-7500

|   | 75%$_{std}$ | 50%$_{std}$ | 25%$_{std}$ |
|---|---|---|---|
| C | 0.93/0.74 | 0.65/1.01 | 0.88/1.06 |
| M | 0.51/0.93 | 0.55/0.99 | 0.52/0.77 |
| Y | 0.99/0.72 | 0.6/0.75 | 0.59/0.65 |
| K | 0.61/1.02 | 0.67/1.08 | 0.54/0.85 |

TABLE 2

Experimental test results for inline-scanner based correction of HP-7500

|   | 75%$_{std}$ | 50%$_{std}$ | 25%$_{std}$ |
|---|---|---|---|
| C | 0.56/0.48 | 0.7/0.84 | 0.88/0.86 |
| M | 0.46/0.5 | 0.7/0.85 | 0.7/0.73 |
| Y | 0.5/0.42 | 0.57/0.65 | 0.69/0.55 |
| K | 0.47/0.5 | 0.66/0.82 | 0.66/0.77 |

As shown in the tables above, the 50% coverage data depicts improvement in each of the separations C, M, Y, and K. However, the 25% and 75% coverage do not depict improvements in all separations when corrected by the 50% uniformity correction. As a result, in some embodiments, the 50% coverage uniformity correction may not be the optimal correction to apply to other coverages. In such embodiments, other coverage uniformity corrections may be generated through the process 50 described above by providing different test pages having the desired coverages.

Figure 4:
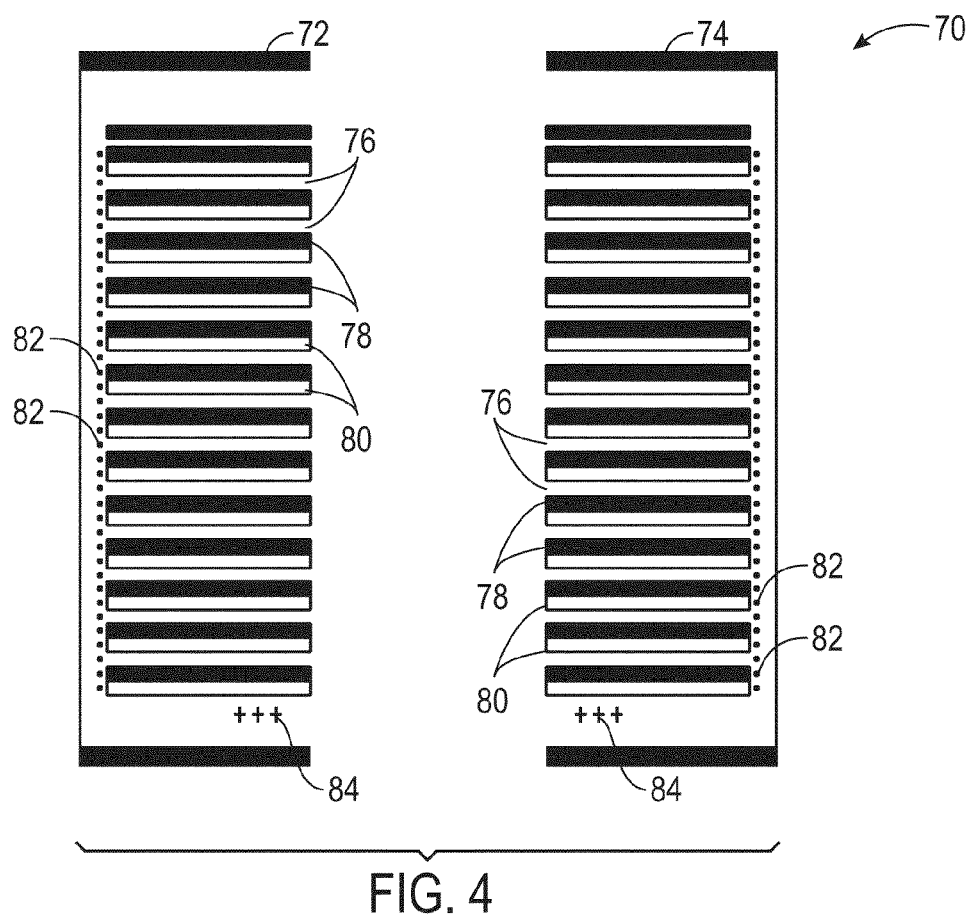
FIG. 4 depicts a scanned image of a test page of the process of FIG. 3 in accordance with an embodiment of the present invention.

FIG. 4 depicts an embodiment of a scanned image 70 from a test page that may be used in the correction process described above. The scanned image 70 may include a left scanner bar 72 and a right scanner bar 74. Each scanner bar 72 and 74 may include alternating rows of white lines 76, black lines 78, and gray lines 80. Each scanner bar 72 and 74 may include fiducials 82 at the end of each line to aid in determination of the end of each line during the correction process. Additionally, the scanned image 70 may include templates, e.g., crosses 84, at the bottom of each scanner bar 72 and 74 to aid in alignment between the two scanner bars.

Figure 5:
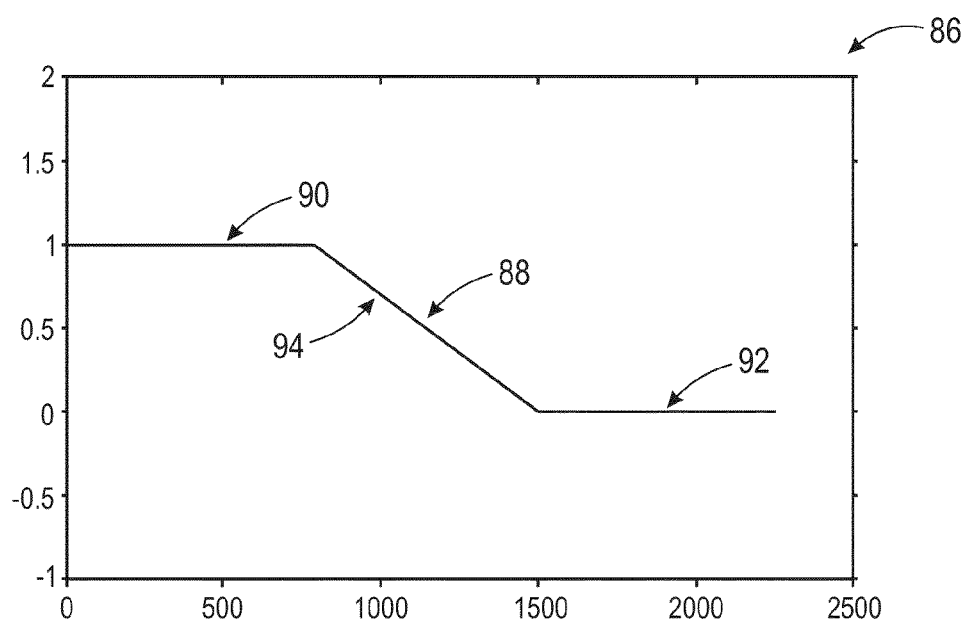
FIG. 5 is a graph of a weight function of the process of FIG. 3 in accordance with an embodiment of the present invention.

FIG. 5 is a graph 86 of an embodiment of a weight function 88 for combining the left and right scanner signals for the left and right scanner bars 72 and 74, as described above. The graph 86 depicts the weight value on the y-axis and the horizontal position of the scanned image on the x-axis. As shown in FIG. 5, the weight function has a value of 1 in the area 90 covered by the left scanner bar 72 and a value of 0 in the area 92 covered by the right scanner 74. In the overlapping area 94, the weight function 88 assigns greater weight to the scanner signal that is further from the scanner bar's edge.

As discussed above, FIG. 6 is a graph 96 of an embodiment of a scanner polynomial 98. The graph 96 also illustrates the normalized combined scanner row data 100, thus showing fitment of the scanner polynomial 98 to this data. The graph 96 depicts the scanner signal value on the y-axis and the horizontal position in the scanned image on the x-axis. As also mentioned above, FIG. 7 is a graph 102 of an embodiment of a scanner polynomial 104, and FIG. 8 is a graph 106 of a non-uniform coverage polynomial 108 derived from the scanner polynomial 104. The x-axis in graphs 102 and 106 corresponds to the horizontal position in the scanner image. The y-axis in graph 102 corresponds to the scanner signal values and the y-axis in graph 106 corresponds to the coverage values.

Figure 9:
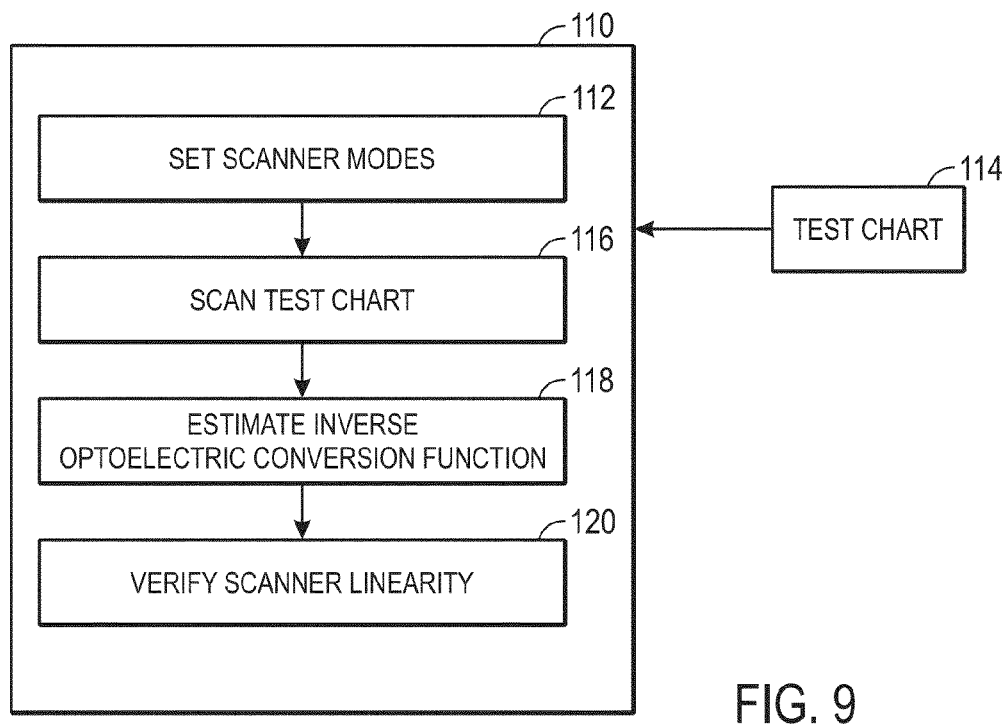
FIG. 9 is a block diagram of a process for verifying the linearity of a scanner in accordance with an embodiment of the present invention.

As discussed above, in certain embodiments the optimal correction may be obtained by using a linear or near linear scanner. For example, configuration of the scanner 21, such as by setting a "no color pipeline" mode, may provide a linear or near linear response suitable for the scanner-based uniformity correction discussed above. However, in some embodiments, it may be useful to verify the linearity of a scanner. FIG. 9 depicts a process 110 for verifying the linearity of an inline scanner in accordance with an embodiment of the present invention. Some or all of the elements of the process 50 may be implemented as executable code instructions stored on a non-transitory tangible machine-readable media, such as the volatile memory 44 and non-volatile memory 46 of the computer 12 and executed by the processor 32, and such as the volatile memory 28 and non-volatile memory 30 of the press 10 and executed by the processor 16.

Figure 10:
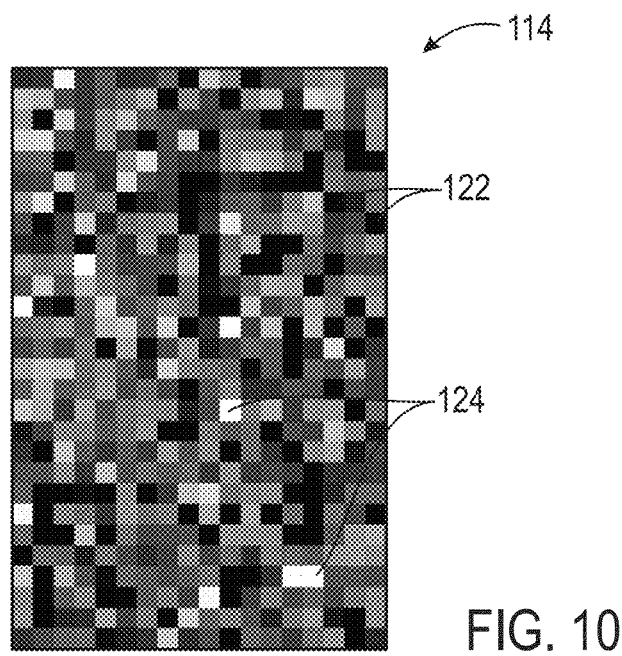
FIG. 10 depicts a scanned image of a test page of the process of FIG. 9 in accordance with an embodiment of the present invention.

Portions of the process 110 of FIG. 9 will also be described with reference to FIGS. 10-12 that illustrate various aspects of the process 110. Initially, the desired scanner modes may be set (block 112). For example, the modes most likely to provide the desired linear response, such as a "no color pipeline" mode, may be set. Using vector notation, and sampling the visible spectrum in thirty-six equally sampled wavelengths, a typical scanner response to a given reflected spectrum vector may be modeled by Equation 19 below:

$$m_i = F_i(P_iS+n), i \in \{1,2,3\} \quad (19)$$

Where:
$m_i$ is scanner response to one of R, G, and B color separations;
$F_i$ is a non-linear optoelectric conversion function (OECF);
$P_i$ is a 1×36 device profile;
S is a 36×1 reflectance spectrum; and
n is a Gaussian noise.

As described below, the process 110 may verify if $F_i$ is linear or almost linear by determining if the inverse OECF $F_i^{-1}$ is linear. Instead of spectrum measurements or specially produced targets, the process 110 uses scans of color patches with known coverages. The process 110 may receive, as input, a test chart 114 that provides such coverages. An embodiment of the test chart 114 is depicted in FIG. 10. The verification process 110 is based on the fact that the spectral response of color patches printed with some digital presses behaves according to the Neugebauer color model. For example, in some embodiments, the test chart 114 may be produced by an Indigo digital press available from Hewlett-Packard Company of Palo Alto, Calif. The test chart 114 may include specific coverages of the Neugebauer primary colors and additional patches with randomly selected ink coverages. According to the Neugebauer model, the reflected spectrum of a printed color patch may be determined as follows in Equation 20:

$$S = P_t \cdot v \quad (20)$$

Where:
$P_t$ is a matrix of the reflected spectra of the Neugebauer primaries; and
v is vector which elements are the Neugebauer primaries coverages that can be computed directly from the ink coverages.

From Equations 19 and 20, the scanner response may be determined by Equation 21 below:

$$m_i = F_i(P_iP_t \cdot v+n), i \in \{1,2,3\} \quad (21)$$

$F_i^{-1}$ may be modeled as a polynomial of a predefined degree k, such as shown below in Equation 22:

$$F_i^{-1}(m_i) = \underline{c}_i * \underline{m}_i^T \quad (22)$$

Where:
$F_i^{-1}$ is the inverse OECF;
$\underline{c}_i = [c_0, c_1, c_2, \ldots c_k]$; and
$\underline{m}_i = [1, m_i, m_i^2, \ldots m_i^k]$.

Thus, using Equation 22, Equation 19 may be rewritten as Equation 23 below:

$$\underline{c}_i * \underline{m}_i^T = \underline{c}_i * M_t \hat{v} + n, i \in \{1,2,3\} \quad (23)$$

Where:
$M_i\hat{}$ is a matrix in which the $n^{th}$ column = $[1, m_{in}, m_{in}^2, \ldots m_{in}^k]^T$; and
$m_{in}$ is the $i^{th}$ scanner measurement of the $n^{th}$ Neugebauer primary.

Next, the test chart 114 may be scanned by the scanner selected for validation (block 116). From the scan, the inverse OECF of the scanner response may be estimated (block 118). In some embodiments, estimation of the inverse OECF may be performed by solving the optimization depicted below in Equation 24:

$$\underline{c}_i = \arg\min_{c'_i}(\|c'_i * A_i\|), s \cdot t \cdot \underline{c'}_i * O^T \quad (24)$$

Where:
O is a vector of ones the same size as $c'_i$;
$A_j$ is a matrix in which the $j^{th}$ column corresponds to the $j^{th}$ random patch, in which may be determined as follows in Equation 25:

$$A_{ij} = \underline{m}_{ij}^T - M_t\hat{} * v_j \quad (25)$$

The assumption of $\underline{c'}_i * O^T = 1$ may be valid under the assumption that a measurement of 1 (the maximal value) is received as a response to a completely white patch of the test chart 114 and the flat reflected spectrum S=1. Based on these assumptions, Equation 24 may be solved to derive Equation 26 below:

$$\underline{c}_i = (A^TA)^{-1}(O(A^TA)^{-1}O^T)^{-1}O^T \quad (26)$$

Based on the determination of $c_i$ in Equation 26, the inverse OECF of the scanner may be estimated from Equation 22 and the linearity of the scanner may be verified (block 120).

As mentioned above, FIG. 10 depicts an embodiment of the test page 114. In some embodiments, as shown in FIG. 10, the test page 114 may include eighty-one Neugebauer model primaries 122 printed three times and two hundred and sixty one random patches 124, permuted randomly.

Figure 11:
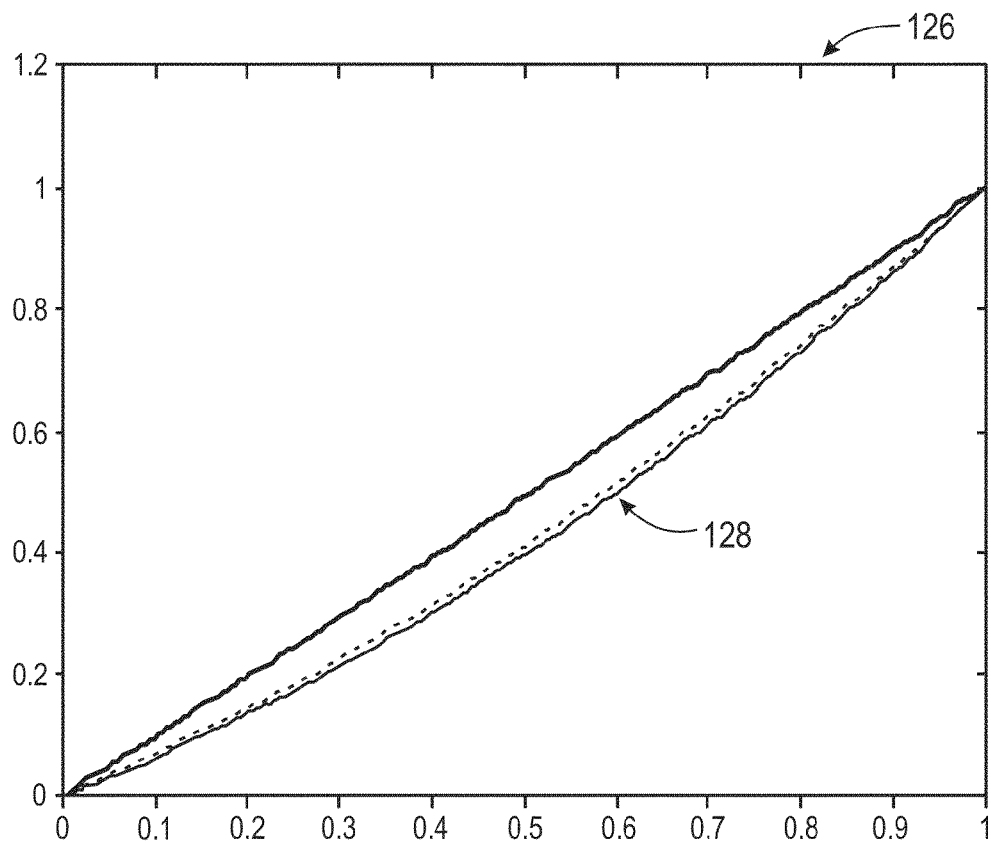
FIGS. 11 and 12 are graphs of inverse optoelectric conversion functions of the process of FIG. 9 in accordance with an embodiment of the present invention.
Figure 12:
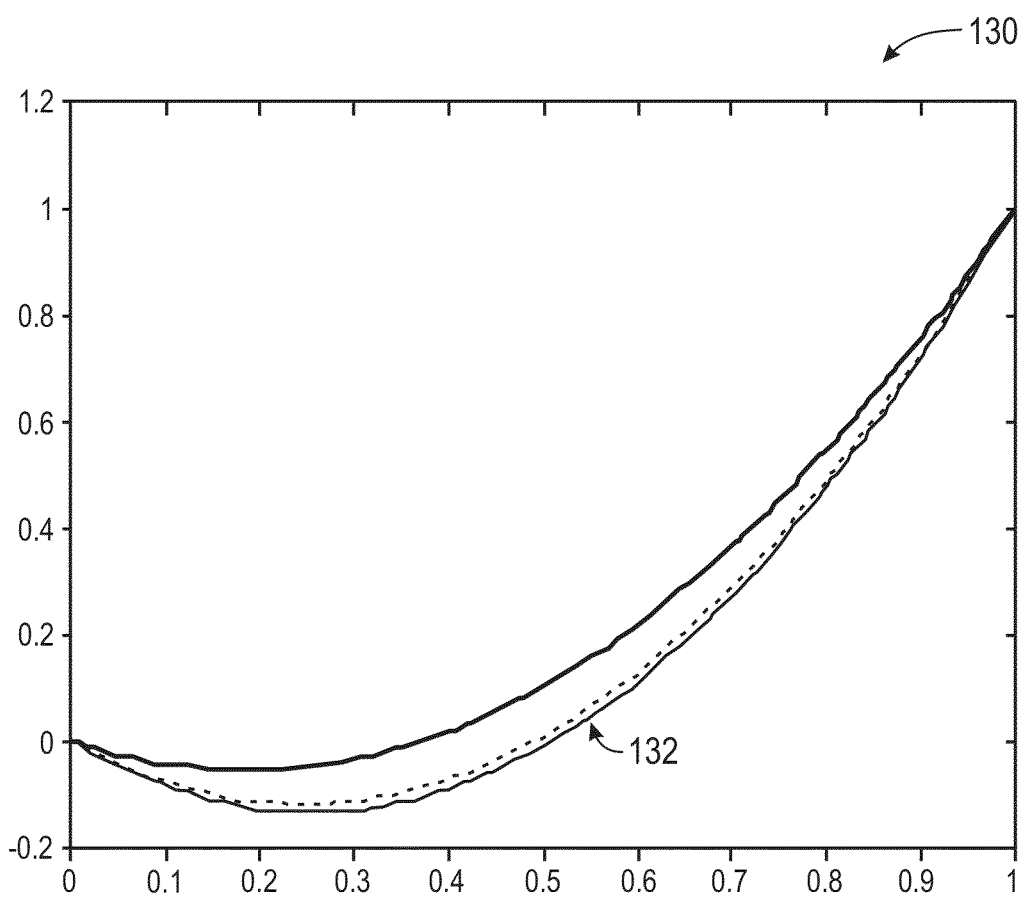

FIG. 11 depicts a graph 126 of the inverse OECF 128 for R, G, and B color separations of a scanner set in a "no color pipeline mode." FIG. 12 depicts a graph 130 of the inverse OECF 132 for R, G, and B color separations for a scanner set in a default mode. As shown in FIG. 11, the inverse OECF 128, as determined by the process 110 described above, is almost linear, thus indicating a relatively linear response of the scanner. In contrast, as shown in FIG. 12, the inverse OECF 132, as determined by the process 110 described above, is clearly not linear and may reflect inaccuracies in the scanner model used in Equation 19.

What is claimed is:
1. A method, comprising
scanning a page by a scanner to produce a scanned image;
determining scanner signal data from the scanned image;
determining a first polynomial from the scanner signal data;
determining a second polynomial from the first polynomial; and
correcting a laser power of a laser printer based on the second polynomial.

2. The method of claim 1, wherein the page comprises a first plurality of lines having a first coverage and a second plurality of lines having a second coverage.

3. The method of claim 2, wherein the page comprises a third plurality of lines having a third coverage.

4. The method of claim 2, wherein determining the scanner signal data comprises extracting the first plurality of lines from the scanned image and normalizing the extracted data according to the second plurality of lines.

5. The method of claim 1, wherein the scanned image comprises a first scanner bar and a second scanner bar.

6. The method of claim 5, wherein determining the scanner signal data comprises combining first scanner signal data of the first scanner bar and second scanner signal data of the second scanner bar.

7. The method of claim 6, wherein combining the first scanner signal data and the second scanner signal data comprising assigning a first weight to the first scanner signal, assigning a second weight to the second scanner signal, and combining the weighted first scanner signal data and the weighted second scanner signal data.

8. The method of claim 1, comprising determining a linearity of the scanner.

9. The method of claim 1, wherein determining the second polynomial from the first polynomial comprises estimating a non-uniform coverage across the page from the first polynomial.

10. The method of claim 9, wherein the second polynomial comprises:

$$P_c^{est}=A_c i^2+B_c i+C_c,$$

wherein $P_c$ is a combined scanner signal, i is a horizontal location on the scanned page, and $A_c$, $B_c$, and $C_c$ are coefficients of the second polynomial.

11. A method, comprising:
verifying a linearity of a scanner of a device comprising the scanner and a laser printer;
in response to verifying the linearity of the scanner, determining scanner signal data from scanning an image using the scanner;
determining a first polynomial from the scanner signal data;
determining a second polynomial from the first polynomial; and
correcting a color uniformity of the laser printer based on the second polynomial.

12. The method of claim 11, wherein verifying the linearity of the scanner comprises determining an inverse optoelectric conversion function of the scanner.

13. The method of claim 11, wherein verifying the linearity of the scanner comprise scanning a second page, wherein the second page comprises a plurality of color patches having Neugebauer primaries.

14. The method of claim 11, wherein correcting the color uniformity of the laser printer comprises correcting a parameter of the laser printer based on the second polynomial.

15. A computer-readable storage device or storage disk, comprising computer readable instructions which, when executed by a processor, cause the processor to at least:
scan a page by a scanner to produce a scanned image;
determine scanner signal data from the scanned image;
determine a first polynomial from the scanner signal data;
determine a second polynomial from the first polynomial; and
correct a laser power of a laser printer based on the second polynomial.

16. The computer-readable storage device or storage disk of claim 15, wherein the page comprises a first plurality of lines having a first coverage and a second plurality of lines having a second coverage.

17. The computer-readable storage device or storage disk of claim 16, wherein the instructions are to cause the processor to determine the scanner signal data by extracting the first plurality of lines from the scanned image and normalizing the extracted data based on the second plurality of lines.

18. The computer-readable storage device or storage disk of claim 15, wherein the instructions are to cause the processor to determine the scanner signal data by combining first scanner signal data of a first scanner bar of the scanned image and second scanner signal data of a second scanner bar of the scanned image.

19. The computer-readable storage device or storage disk of claim 15, wherein the instructions are to cause the processor to determine the second polynomial from the first polynomial by estimating a non-uniform coverage across the page from the first polynomial.

20. The computer-readable storage device or storage disk of claim 15, wherein the second polynomial comprises:

$$P_c^{est}=A_c i^2+B_c i+C_c,$$

wherein $P_c$ is a combined scanner signal, i is a horizontal location on the scanned page, and $A_c$, $B_c$, and $C_c$ are coefficients of the second polynomial.

* * * * *